United States Patent [19]

Friedl et al.

[11] 3,858,116

[45] Dec. 31, 1974

[54] PULSE-WIDTH MODULATION CONTROL SYSTEM AND DISCRIMINATOR THEREFOR

[75] Inventors: Wendel M. Friedl; Robert A. Miles, both of Cleveland; John W. Allen, Hudson; William P. Waiwood, Parma, all of Ohio

[73] Assignee: Johnson Diversified, Inc., Racine, Wis.

[22] Filed: May 9, 1973

[21] Appl. No.: 358,561

[52] U.S. Cl. .................. 325/37, 318/16, 325/392, 325/487, 340/167 A

[51] Int. Cl. .............................. H04b 7/00

[58] Field of Search ............ 325/37, 39, 53, 55, 64, 325/309, 390–393, 411, 457, 468, 487; 340/167 R, 167 A, 206, 353; 318/16; 343/225, 228; 329/104, 106

[56] References Cited

UNITED STATES PATENTS

| | | | |
|---|---|---|---|
| 2,515,254 | 7/1950 | Nosker | 343/225 |
| 2,643,369 | 6/1953 | Manley et al. | 325/37 |
| 2,991,422 | 7/1961 | Yaeger | 329/104 |
| 3,351,945 | 11/1967 | Borsattino et al. | 343/225 |
| 3,582,783 | 6/1971 | Hendrickson | 325/37 |
| 3,768,019 | 10/1973 | Podowski | 325/391 |

*Primary Examiner*—Benedict V. Safourek
*Assistant Examiner*—Jin F. Ng

[57] ABSTRACT

Disclosed herein is a pulse-width modulation control system including a switching circuit connected to a transmitter of pulsed RF signals, wherein the switching circuit is for selecting different RF pulse widths corresponding to different functions to be controlled. A receiver circuit is provided for sensing the RF pulses, and for coupling such pulses to a discriminator having various outputs corresponding in number to the different pulse widths which can be selected by the switching circuit. The discriminator includes a pulse processor circuit which generates output signals, one of which is coupled to a plurality of delay circuits capable of distinguishing between the various pulse widths selected by the switching circuit. The delay circuits are coupled through logic circuits to a plurality of relays which may be connected for example, to drive control motors.

6 Claims, 5 Drawing Figures

PULSE-WIDTH MODULATION CONTROL SYSTEM AND DISCRIMINATOR THEREFOR

BACKGROUND OF THE INVENTION

This invention pertains to a control system responsive to transmitted RF signals, wherein the system is capable of controlling a plurality of different functions. Various relatively complex control systems using RF links have been disclosed in the past, as for example systems providing tone modulation which require very sophisticated filters in the receiving device, and systems utilizing pulsetime modulation which require a relatively complex transmitter device.

Accordingly, an object of this invention is to provide such a control system wherein the required functions can be selectively controlled in a reliable manner by means of transmitting and receiving circuitry which is relatively simple and economical to manufacture and operate. A further object of this invention is to provide such a system which is especially useful for controlling a trolling motor whereby, for example, a switching circuit may permit the selection of six different pulse widths to enable bi-directional remote control of the speed of the trolling motor, the direction of its thrust, and the raising and lowering of the trolling motor from the water.

SUMMARY OF THE INVENTION

In accordance with the invention there is provided a control system for producing different electrical output signals in response to different pulse-width signals generated by a transmitter, wherein each different pulse width corresponds to a different function to be controlled by the system.

In particular, the system includes a transmitter of RF pulses, wherein a switching circuit is connected to the transmitter for selecting the function to be controlled. Thus, each switch connected to the transmitter causes the latter to produce a different pulse-width signal. A re-receiver is provided for sensing the RF pulses, and for applying those pulses to a discriminator which includes a plurality of output terminals corresponding in number to the number of different pulse width signals which may be produced by the transmitter. The outputs from the discriminator are applied to logic circuits which control relay drivers for actuating a group of relays connected to control the various functions to be performed by the system.

For example, the relays may be used to control a plurality of motors which are connected in a parallel configuration for being selectively energized to operate in either direction of rotation.

The discriminator includes a pulse processor circuit for receiving the pulsed signals from the receiver, and for generating three time-related output signals for each input pulse. One of the outputs of the pulse processor circuit is a pulsed signal related in length to the length of the receiver RF pulse, and that output is applied to a plurality of delay circuits. The outputs of the delay circuits are coupled to a corresponding number of first-stage logic circuits which receive a second input from the pulse processor circuit, so that only the logic circuit which simultaneously receives an input from the pulse processor circuit and from an appropriate one of the delay circuits produces an output for application to one of a group of second-stage logic circuits. Each of the second-stage logic circuits comprises a flip-flop which is reset at the beginning of an output from one of the first-stage logic circuits, whereafter the flip-flop which receives such an output signal is set to provide a constant output until the reception of the next reset pulse. The outputs of the flip-flop circuits are connected to a plurality of OR circuits which control the relay devices for energizing the above mentioned relays.

BRIEF DESCRIPTION OF THE DRAWINGS

The accompanying drawings illustrate one embodiment of the invention. In such drawings.

DETAILED DESCRIPTION OF A PREFERRED EMBODIMENT OF THE INVENTION

Figures 1, 2:
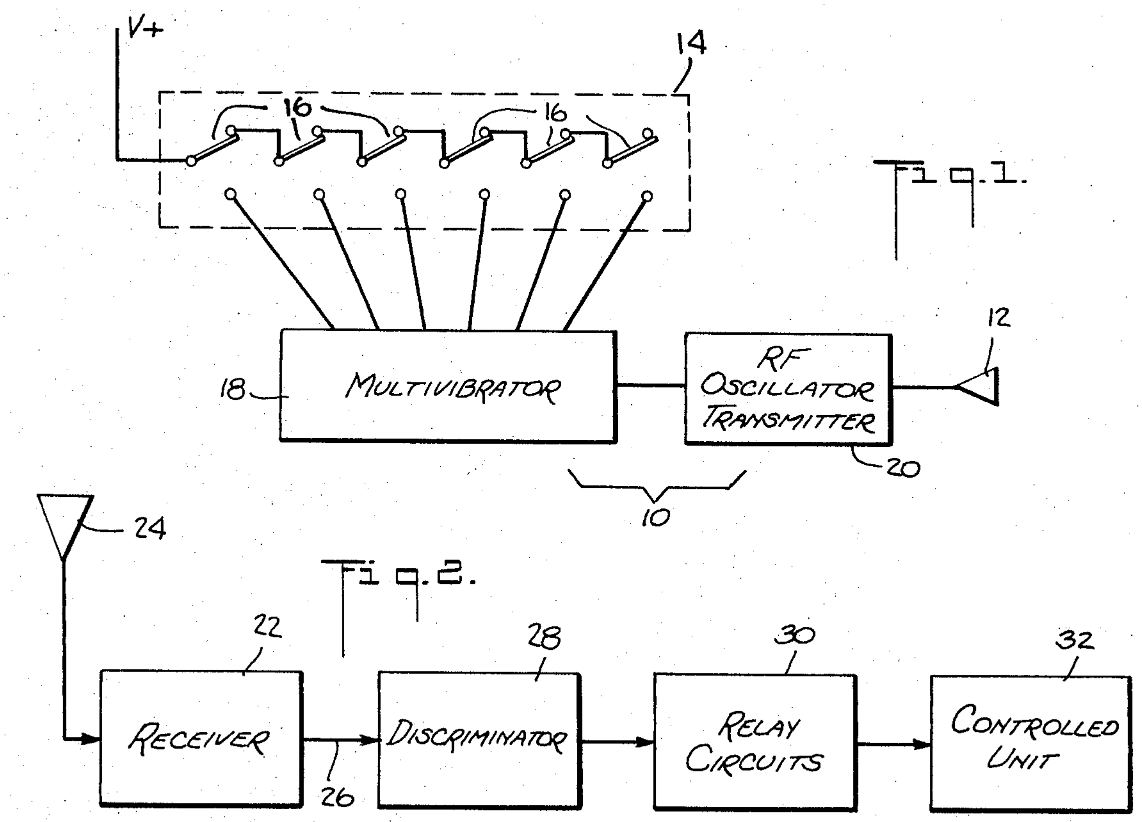
FIG. 1 is a block diagram illustrating a selector switching circuit connected with an RF pulse transmitter.
FIG. 2 is a block diagram illustrating the signal flow through the receiving and controlling portion of the system.

A preferred embodiment of this invention includes a transmitter 10 of RF pulses coupled to a transmitting antenna 12, and as illustrated in FIG. 1 that transmitter may be connected to a switching circuit 14 including a plurality of switches 16 for selectively controlling the transmitter to generate pulses of different pulse-widths. The transmitter may comprise, for example, a multivibrator 18 having an output for gating a crystal controlled oscillator-transmitter circuit 20, so that the oscillator is gated on and off to provide bursts of RF energy having durations which are determined by the switching time-constants of the multivibrator 18. As illustrated, the switches 16 may be connected in a series manner with a corresponding plurality of resistors (not shown) coupled to the multivibrator. Thus, in the case where the multivibrator 18 is of the astable type, the resistors can be connected to control the switching time-constant of one-half of the multivibrator, so that each switch 16 controls the multivibrator 18 to gate the oscillator to produce a different pulse width of RF energy at the antenna 12.

The transmitted RF pulses are received and discriminated by circuitry shown for example in the block diagram of FIG. 2 of the drawings. A receiver 22, connected to a receiving antenna 24 may comprise a super-regenerative detector which provides a decreased regenerative quench frequency signal upon reception of each of the RF pulses. The quench frequency may then be filtered out to yield a series of pulses having a repetition frequency and duration corresponding to the pulses generated by the astable multivibrator which gates the oscillator in the transmitter 10. The receiver 22 also amplifies the pulse signals for application by a conductor 26 to a discriminator 28 for effectively timing each of the pulses to determine which of the functions has been selected by the switches 16 connected to the transmitter 10. As shown further in FIG. 2, the discriminator outputs are coupled to relay circuitry 30 which includes a plurality of relays for being energized in a predetermined manner depending upon which of the selector switches 16 has been actuated. Finally, the relays may be connected to energize a controlled unit 32 such as a plurality of motors for accomplishing the desired functions.

Figure 3:
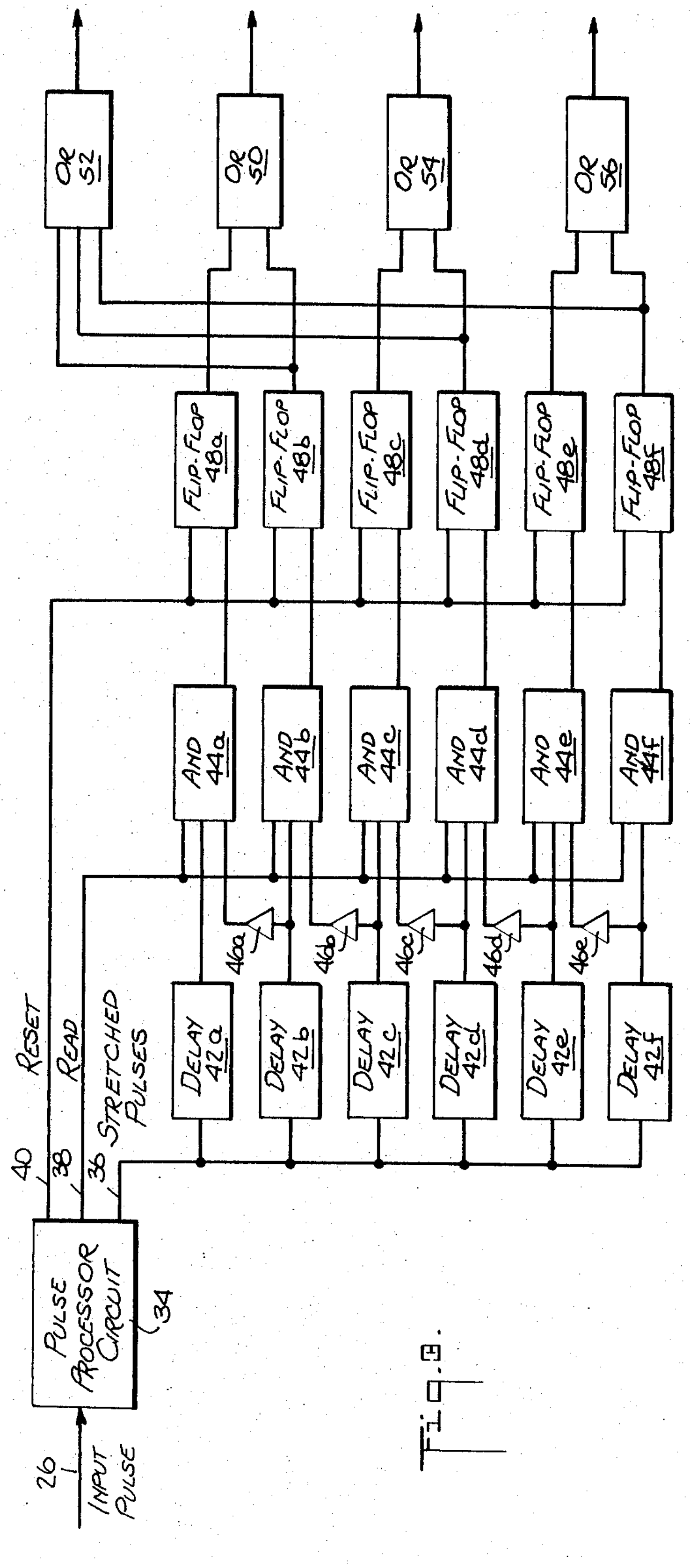
FIG. 3 is a block diagram of the discriminator portion of the system illustrated in FIG. 2.
Figure 4:
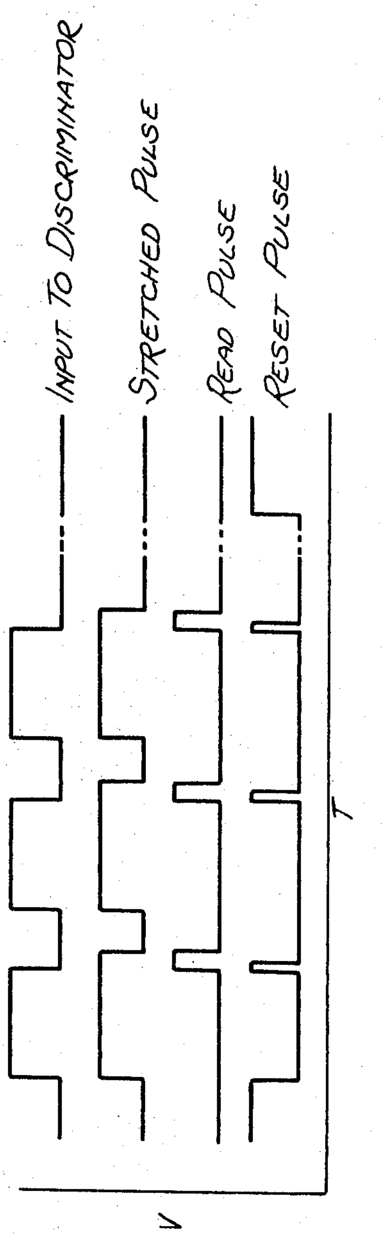
FIG. 4 illustrates various wave forms produced by the discriminator illustrated in FIG. 3.

A preferred embodiment of the discriminator 28 is shown in block diagram form in FIG. 3 of the drawings wherein the output pulses from the receiver 22 are applied by the conductor 26 to a pulse processor circuit 34 which provides three time-related output signals illustrated for example in FIG. 4 of the drawings.

Specifically, the uppermost pulse train illustrated in FIG. 4 depicts the input signals from the receiver, as applied along conductor 26, wherein each of the positive going portions of that pulse train has a duration which is equal to the pulse width of RF pulses from the transmitter 10 as determined by a particular one of the selector switches 16. The next lower pulse train in FIG. 4 depicts the signals generated at an output 36 of the pulse processor circuit, wherein each of the pulses at the output 36 comprises a stretched pulse having a starting time synchronized with the starting time of an input pulse at conductor 26, and a duration which is a predetermined constant period greater than said input pulse. That is, each stretched pulse has a duration equal to X plus Y, wherein X is the duration of the preceding input pulse, and Y is a predetermined fixed value.

The next lower pulse train illustrated in FIG. 4 shows a series of read pulses generated at an output 38 of the pulse processor circuit 34, and said read pulses are synchronized with the stretched portion of each of the stretched pulses. Also, the lowermost pulse train illustrated in FIG. 4 corresponds to the third output 40 of the pulse processor circuit and defines a series of reset pulses synchronized with the termination of each of the input pulses which are coupled to the pulse processor circuit along conductor 26.

Referring again to FIG. 3, there is provided a series of delay circuits 42(*a–f*) corresponding in number to the number of different pulse widths which can be generated by the transmitter. Each of the delay circuits provides an output signal whixh is identical to the stretched pulse signal applied thereto from the pulse processor circuit, with the exception that the rise time of such output signal is delayed for a different length of time in each of the delay circuits. For example, the first delay circuit 42*a* delays the rise time of pulses applied thereto for a period which is slightly shorter than the duration of the shortest transmitted RF pulse. Similarly, the remaining delay circuits function to delay the rise time of the output pulses therefrom for periods corresponding respectively to remaining durations of RF pulses generated by the transmitter 10. Then, the outputs from the delay circuits are connected directly to a corresponding number of logic circuits which may comprise AND circuits 44(*a–f*) and all but the first of such delay circuit outputs are connected through inverters 46(*a–e*) to the next preceding logic circuit. That is, for example, the output of the second delay circuit 42*b* is connected through an inverter 46*a* to an input of the first logic circuit 44*a*, while the output of the third delay circuit 42*c* is connected through an inverter 46*b* to an input of the second logic circuit 44*b*, etc. Also, the read signal output 38 of the pulse processor circuit is connected as a third input to each of the logic circuits, 44(*a–f*) so that the logic circuits provide output signals only when there is a simultaneous occurrence of the READ signal, an output of the delay circuit 42 corresponding to that logic circuit, and the absence of an output from the next succeeding delay circuit as coupled thereto by one of the inverter circuits 46. Accordingly, in operation, when the shortest RF transmitted pulse is generated, only the first delay circuit will provide an output, since the delay times for the remaining delay circuits will not have timed out during the period of the stretched pulse from the pulse processor circuit corresponding to that shortest transmitted pulse. That is, when said shortest RF transmitted pulse is generated, AND circuit 44*a* will receive a READ signal from the pulse processor circuit output 38; a delay circuit output signal from the delay circuit 42*a*, and, an inverted "zero" output signal from the delay circuit 42*b*. Under these conditions, each of the remaining AND circuits will receive only the READ signal and the inverted zero signal from its next succeeding delay circuit. On the other hand, all of the delay circuits will provide output signals after the transmission of the longest RF pulse from the transmitter, but in that case, only the logic circuit 44*f* corresponding to the last delay circuit 42*f* will provide an output signal, since all of the other logic circuits 44*a*–44*e* will have zero input signals coupled from the inverter circuits connected thereto.

The outputs of the logic circuits 44(*a–f*) are connected respectively to the "set" inputs of a corresponding number of Flip-Flop circuits 48(*a–f*), and the RESET signal is applied from the pulse processor circuit output 40 to each of the "reset" inputs to the Flip-Flop circuits. As can be seen from the time relation between the various pulses as shown in FIG. 4, the Flip-Flops will be reset at the beginning of the output from one of the logic circuits as controlled by the READ signal, so that only the appropriate Flip-Flop corresponding to the function selected by the transmitter switches will provide an output. As depicted at the beginning and end of the Reset Pulse wave form of FIG. 4, the Flip-Flops are maintained in a reset condition in the intervals between transmissions. Thus, a Reset signal is generated continuously during the periods beginning a short time after the cessation of a train of pulses and lasting until commencement of a subsequent train of pulses.

In general, the Flip-Flops 48*a*–48*f* may be arranged in pairs wherein each pair is connected to control a single functional motor, as for example a steering motor for a vehicle. Thus, rotation in one direction of the motor shaft as controlled by one of the Flip-Flops in the pair will cause the vehicle to be steered to the left, while rotation in the opposite direction of the motor shaft as controlled by the other Flip-Flop in the pair will cause the vehicle to be steered to the right. As illustrated, the first two Flip-Flops 48*a* and 48*b* have their outputs connected through a single OR circuit 50, the output of which may be coupled through a relay driver for energizing a relay to supply power to the steering motor, whereas the output of the Flip-Flop 48*a* is also connected to a second OR circuit 52 having its output connected through a second relay circuit for reversing the direction of rotation of the steering motor which is energized in response to the output from the first OR circuit 50. The third and fourth Flip-Flop 48*c* and 48*d* are connected through a third OR circuit 54 to another relay circuit which may be arranged to actuate a second function controlling motor, while the output of the Flip-Flop 48*d* is also connected to the second OR circuit 52 which controls the reversal of rotation of the motor shafts. Similarly, the fifth and sixth Flip-Flop 48*e* and 48*f* are connected to a fourth OR circuit 56 for providing an output which may be coupled through another relay circuit to control a third motor, while the output of the Flip-Flop 48*f* is also coupled to the second OR circuit 52 for reversing the direction of shaft rotation of the last-mentioned motor.

Figure 5:
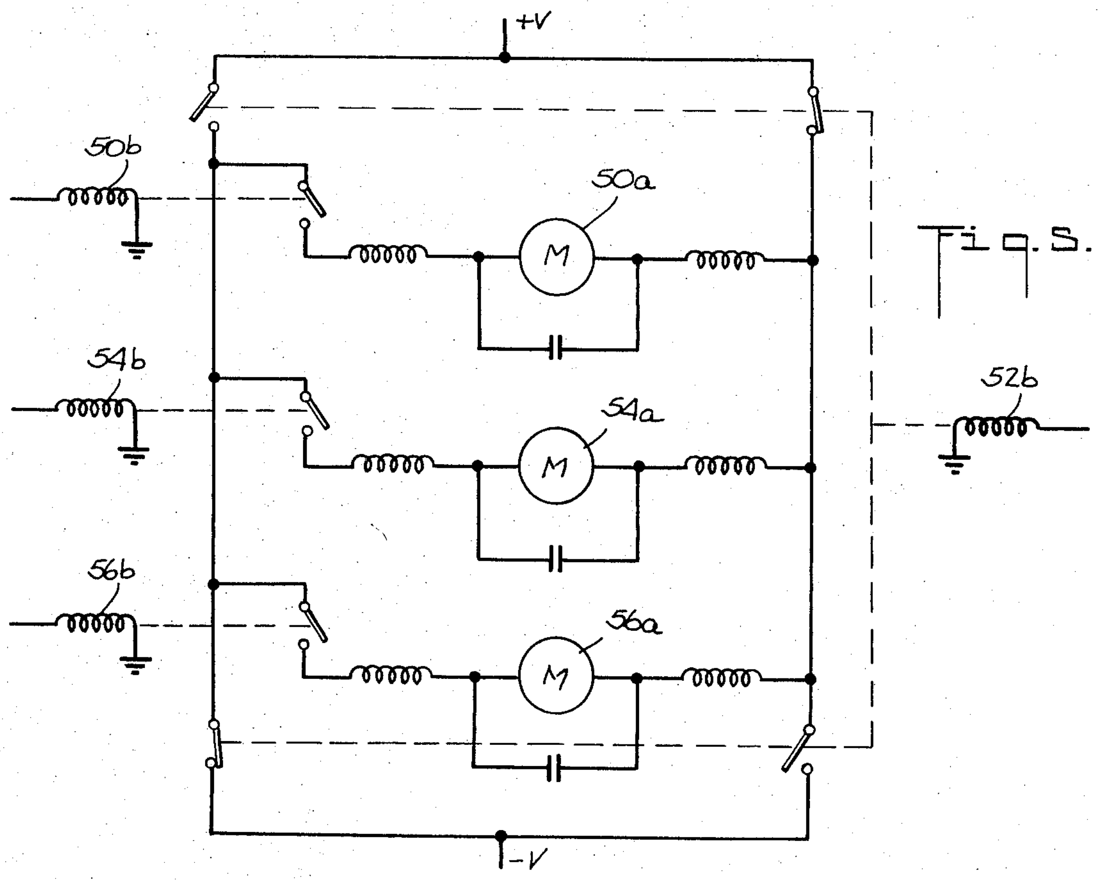
FIG. 5 is a schematic drawing illustrating a plurality of motors connected together for operation by the relay driver circuits illustrated in FIG. 3.

It has been found to be preferable to incorporate two dual input NAND circuits for use as each of the Flip-Flops 48. In such cases the set and reset signals are connected to opposed ones of the NAND circuits while their outputs are also fed back as inputs. A representative motor-control circuit is illustrated in FIG. 5 wherein three motors 50*a*, 54*a* and 56*a* are connected in parallel through the relay contacts of separate relays 50*b*, 54*b*, and 56*b*, while a double-pole double-throw relay 52*b* interconnects the motors with a supply voltage source. The above-mentioned relays are controlled by separate driver circuits (not shown) which in turn are energized respectively by the correspondingly numbered OR circuits 50, 52, 54 and 56, so that the OR circuit 52 controls the direction of the energizing current while the remaining OR circuits 50, 54 and 56 determine which of the motors is to be actuated.

It is to be understood, of course, that while the drawings illustrate six different selector switches for controlling six different functions, additional selector switches and functions can be added to the system by expanding the discriminator and function control circuitry in a manner which will be readily understood by those skilled in the art. Furthermore, the discriminator will respond to received signals generated by sources other than RF transmitters, and can be used for example, in ultrasonic and light source systems.

What is claimed to be desired and secured by Letters Patent is:

1. In a control system including an RF transmitter of input control signals and an RF receiver for generating output control signals in response to said input signals, the combination comprising a switching circuit for selecting any one of a plurality of three or more control functions, a multivibrator coupled to said switching circuit for producing pulsed output signals having different predetermined durations dependent upon selections made by said switching circuit, an RF oscillator-transmitter connected to said multivibrator for producing bursts of RF energy having durations corresponding to the output signals from said multivibrator, an RF receiver for receiving and demodulating said bursts of RF energy and for producing pulse signals having durations corresponding to said pulsed output signals generated by said multivibrator, discriminator means having a plurality of output terminals corresponding in number to the number of said switching circuit selections, wherein said discriminator means is for providing output control signals at said respective terminals in correspondence with the selected control functions, and function control means coupled to said discriminator means output terminals for actuation thereby in response to said selections made by said switching circuit, said discriminator means comprising pulse processor circuit means having an input coupled to receive said pulse signals from said receiver and having a first output for producing a stretched output signal in response to each input signal, wherein each said stretched output signal has a duration which is coextensive with, and a predetermined increment longer than, its corresponding input pulse signal, and having a second output for producing READ pulses which are coextensive with only said predetermined increments of said stretched pulses; said discriminator means further comprising a plurality of delay circuit means corresponding in number to said plurality of control functions selectable by said switching circuit, each said delay circuit means having an input coupled to said first output for producing a delay signal in response to said stretched signals and after a predetermined delay period, wherein said delay circuit means have respective delay periods which are coextensive with said predetermined durations of said pulsed output signals from said multivibrator; and said discriminator means further comprising a plurality of AND circuits corresponding in number to said delay circuit means, and means coupling said AND circuits to said delay circuit means and to said second output of said pulse processor circuit means, wherein said AND circuits provide output control signals corresponding, respectively, to said selected control functions.

2. A control system as set forth in claim 1, wherein said function control means comprises a plurality of electric motors, a corresponding plurality of relays having contacts connected respectively in series combination with energization windings of said motors, said series combinations of motors and relay contacts being connected in parallel, current reversing relay means having contacts for coupling said series combinations to a source of power, and a plurality of logic circuit means coupled between said discriminator means output terminals and said relays and current reversing relay means for energizing a selected one of said motors for rotation in a predetermined direction in response to a selected switching circuit control function.

3. A control system as set forth in claim 1, further comprising a plurality of Flip-Flop circuits corresponding in number to said plurality of AND circuits, each said Flip-Flop circuit having first and second inputs wherein said first inputs are coupled respectively to said AND circuit outputs; wherein said pulse processor circuit means provides a RESET pulse output at the start of each READ pulse, said RESET pulse output being applied to said second input of each said Flip-Flop circuit; and wherein said Flip-Flop circuits provide output signals in response to input control signals applied to the first inputs thereof, said Flip-Flop circuits being reset by said RESET pulse outputs.

4. A control system as set forth in claim 3, wherein said function control means comprises a plurality of electric motors, a corresponding plurality of relays having contacts connected respectively in series combination with energization windings of said motors, said series combinations of motors and relay contacts being connected in parallel, current reversing relay means having contacts coupling said series combinations to a source of power, and a plurality of logic circuit means having inputs to which said Flip-Flop output signals are applied, and having outputs coupled to said relays and said current reversing relay means for energizing a selected one of said motors for rotation in a predetermined direction in response to the selected switching circuit control function.

5. In a system including a transmitter of pulsed signals having different predetermined pulse-widths and a receiver for generating output pulses in response to said pulsed signals, the improvement comprising discriminator means having a plurality of output terminals corresponding in number to the number of said different predetermined pulse widths, and having an input coupled to said receiver, wherein said discriminator means is for providing output signals at different ones of said output terminals in correspondence to the transmission of said different predetermined pulse widths; and wherein said discriminator means includes pulse processor circuit means having an input coupled to receive said output pulses from said receiver, having a first output for producing a stretched output signal in response to each input pulse applied thereto, wherein each said stretched output signal has a duration which is coextensive with, and a predetermined increment longer than its corresponding input pulse signal, and having a second output for producing READ pulses which are coextensive with only said longer increments of said stretched pulses; said discriminator means further including a plurality of delay circuit means corresponding in number to said output terminals, each said delay circuit means having an input coupled to said first pulse processor circuit output for producing a delay signal in response to said stretched signals and after a predetermined delay period, and said delay circuit means having respective delay periods which are coextensive with said different predetermined pulse widths; and said discriminator means further including a plurality of AND circuits corresponding in number to said delay circuit means, and means coupling said AND circuits to said delay circuit means and to said second output of said pulse processor circuit means, wherein said AND circuit outputs are coupled respectively to said output terminals of said discriminator means.

6. A control system as set forth in claim 5, further comprising a plurality of Flip-Flop circuits corresponding in number to said plurality of AND circuits, each said Flip-Flop circuit having first and second inputs wherein said first inputs are coupled respectively to said AND circuit outputs; wherein said pulse processor circuit means provides a RESET pulse output at the start of each READ pulse, said RESET pulse output being applied to said second input of each said Flip-Flop circuit; and wherein said Flip-Flop circuits provide an output signal in response to each signal applied to the first inputs thereof, said Flip-Flop circuits being reset by said RESET pulse outputs.

* * * * *

UNITED STATES PATENT OFFICE
CERTIFICATE OF CORRECTION

Patent No. 3,858,116 Dated December 31, 1974

Inventor(s) Wendel M. Friedl, Robert A. Miles, John W. Allen, and William P. Waiwood It is certified that error appears in the above-identified patent and that said Letters Patent are hereby corrected as shown below:

Column 2, line 7, insert --driver-- after "relay".

Column 3, line 42, "whixh" should be "which".

Column 4, line 40, the word reset should be set off in quotation marks.

Column 4, line 59, "48a" should be "48b".

Column 5, line 12, the words set and reset should be set off in quotation marks.

Signed and sealed this 1st day of April 1975.

(SEAL)
Attest:

RUTH C. MASON
Attesting Officer

C. MARSHALL DANN
Commissioner of Patents
and Trademarks

ORM PO-1050 (10-69)

USCOMM-DC 60376-P69
★ U.S. GOVERNMENT PRINTING OFFICE : 1969 O—366-334.